US006182861B1

(12) United States Patent
Kovens et al.

(10) Patent No.: US 6,182,861 B1
(45) Date of Patent: *Feb. 6, 2001

(54) ELECTRONIC BULK VENDING MACHINE SYSTEM

(75) Inventors: Steven A. Kovens, Owings Mills; Michael T. Gootee, Baltimore; Robert H. Tegtmeier, Phoenix, all of MD (US); Ronald F. Deuel, Shrewsbury, PA (US)

(73) Assignee: Parkway Machine Corporation, Timonium, MD (US)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/323,289

(22) Filed: Jun. 1, 1999

Related U.S. Application Data

(60) Division of application No. 08/967,939, filed on Nov. 12, 1997, which is a continuation-in-part of application No. 29/069,632, filed on Mar. 26, 1997.

(51) Int. Cl.$^{7}$ .............................. B65G 59/00; G07F 11/44
(52) U.S. Cl. .......................... 221/258; 221/265; 221/155; 221/129
(58) Field of Search .................................... 221/129, 155, 221/123, 124, 126, 131, 264, 265, 258

(56) References Cited

U.S. PATENT DOCUMENTS

D. 314,402 * 2/1991 Kovens .
D. 314,794 * 2/1991 Kovens .
D. 344,762 * 3/1994 Peterson .
D. 347,448 * 5/1994 Hinton .
D. 370,694 * 6/1996 Kovens et al. .
D. 372,500 * 8/1996 Hinton .
D. 373,386 * 9/1996 Beene et al. .
D. 381,169 * 7/1997 Kovens et al. .
D. 387,385 * 12/1997 Kovens et al. .
1,632,838 * 6/1927 Higgins .
2,273,814 * 2/1942 Bartel et al. .
3,390,753 * 7/1968 Bolen et al. .
3,822,004 * 7/1974 Bolen .
4,223,210 * 9/1980 Verduin .
4,257,531 * 3/1981 Kimura et al. .
4,311,227 * 1/1982 Watkins .
4,354,613 * 10/1982 Desai et al. .
4,386,691 * 6/1983 Voegeli .
4,671,426 6/1987 Grossi .
4,927,051 * 5/1990 Falk et al. .
4,967,896 * 11/1990 Hara .

(List continued on next page.)

FOREIGN PATENT DOCUMENTS 20080237 10/1991 (CA) .
90/01756 * 2/1990 (WO) .................................. 221/265

OTHER PUBLICATIONS

Vend, Apr. 1, 1965, p. 48, Victor Vending advertisement.*
A&A Company Parkway Machine Corporation Catalog 1996.*
COINCO BA32R Series Bill Acceptor Installation Guide.*
COINCO The 9302–GX Coin Changer.*

* cited by examiner

*Primary Examiner*—Christopher R Ellis
*Assistant Examiner*—Mark A. Deuble
(74) *Attorney, Agent, or Firm*—Cahn & Samuels, LLP

(57) ABSTRACT

An electronically actuated bulk vending machine with a merchandise storage globe seated on a base for electronically actuated distribution of the merchandise via a rotatable merchandise wheel nested in the base and under the storage globe where the machine includes an electric motor for rotating a gear where the gear extends from the motor to engage the merchandise wheel along the peripheral gearing thereof.

15 Claims, 7 Drawing Sheets

U.S. PATENT DOCUMENTS 4,976,376 * 12/1990 Williams .............................. 221/265
5,014,877 * 5/1991 Roos .................................... 221/258
5,036,966 * 8/1991 Kaspar et al. .
5,091,713 * 2/1992 Horne et al. .
5,172,605 * 12/1992 Schwartz .
5,301,834 * 4/1994 Lee et al. ............................. 221/129
5,339,250 * 8/1994 Durbin .
5,360,093 * 11/1994 Baer .
5,450,938 * 9/1995 Rademacher .
5,564,547 * 10/1996 Ranon et al. .
5,667,096 * 9/1997 Wu .
5,685,435 * 11/1997 Picioccio et al. .
5,743,429 * 4/1998 Morofsky ............................. 221/258
5,823,386 * 10/1998 Vandenberg .......................... 221/265
5,947,328 * 9/1999 Kovens et al. ....................... 221/129

FIG. 13
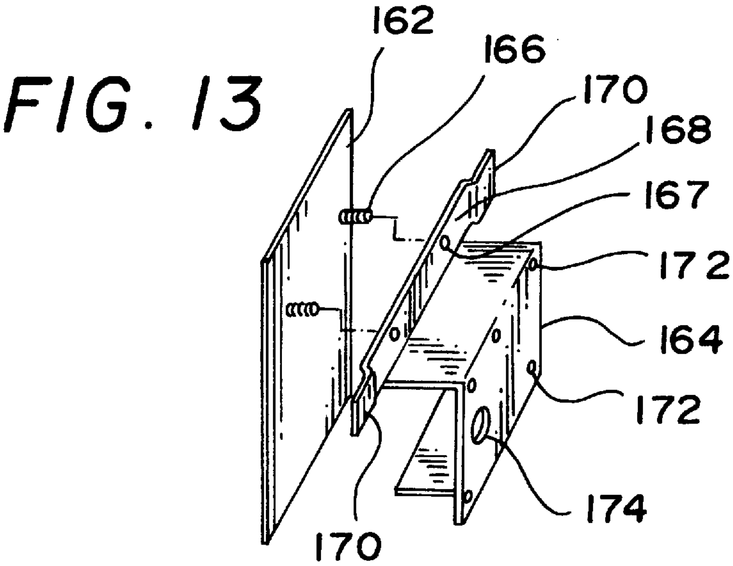
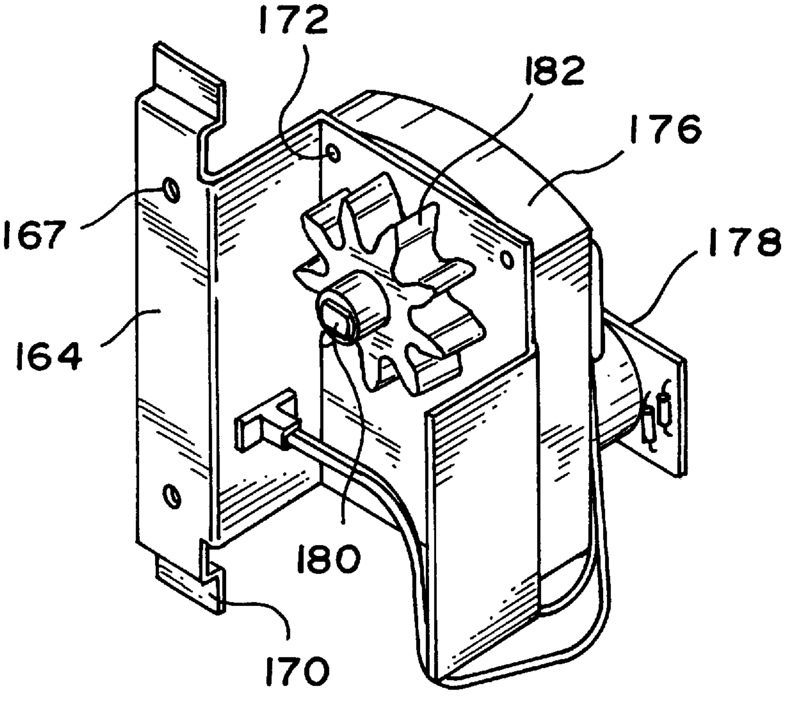
FIG. 14

ELECTRONIC BULK VENDING MACHINE SYSTEM

RELATED APPLICATION

This is a continuing prosecution application from copending, U.S. patent application 09/323,289 which was a divisional application from U.S. patent application Ser. No. 08/967,939 filed Nov. 12, 1997 which was a continuation-in-part application to U.S. Design patent application Ser. No. 29/069,632 filed Mar. 26, 1997.

TECHNICAL FIELD

The present invention is directed to improvements in bulk vending systems, assemblies and methodologies. More particularly, the invention relates to an electronic vending machine system and assembly that incorporates a plurality of independently, electronically actuated bulk vending machines for dispensing product associated with each such machine. An electronic bulk vending machine assembly and system according to the invention, provides an integrated electronically actuated and common central dispensing control system for communicating actuation signals to each of the bulk vending machines for selective dispensing of merchandise therefrom. The invention also permits for remote and even off-site control, monitoring, and auditing of the assembly as a whole as well as each machine individually. Additionally, the invention contemplates convertibility of individual dispensing bulk vending machines between conventional crank actuation structures and electronic dispensing mechanisms.

BACKGROUND OF THE INVENTION

Coin operated bulk vending machines of the type used to vend candy, nuts, capsules containing articles, gum, and the like are commonplace. Such devices typically are found in public locations such as stores, taverns, malls, etc. Conventional bulk vending machines comprise two primary operational segments, the merchandise storage globe and the base. The merchandise storage globe typically projects above the base and is supported by a nesting relation thereon. The base contains a coin mechanism for receiving selected coinage and commonly features a merchandise discharge chute/chute cover assembly for dispensing vended goods. While gravity provides the predominant force utilized in dispensing merchandise from bulk vending machines, mechanical force must be generated to move the merchandise from the globe, through a segmented merchandise wheel to an underlying dispensing opening. Typically, such actuating force is provided by a crank handle linked through selected gearing to the rotatable, segmented merchandise wheel disposed intermediate of the globe. Typically, the wheel is associated with a plurality of radially directed spring brushes which rotate therewith to assist in the mechanical movement by sweeping the merchandise into one of the discrete wheel segments which rotates progressively within the hopper. Because the merchandise wheel is nested within the hopper, as it rotates, it transports the merchandise in a discrete segment to an underlying discharge opening corresponding to the top of a discharge chute.

In operation, after the appropriate, authorized coinage is placed in the coin slot(s) disposed in the mechanism, the manual crank handle is released to rotate one complete turn (360°). As the crank handle is turned, it imparts an amount of incremental rotation (e.g. 60° or quadrants) which is determined by the gearing, to the merchandise wheel and the brushes to cause the discharge of merchandise to the chute.

Such machines are generally described in U.S Pat. No. 5,467,858 and a conventional bulk vending coin mechanism is described in U.S. Pat. No. 5,111,928, both of which are incorporated herein by reference.

Due to a number of factors including inflation, coinage alone may no longer be the most practical means for vending. Bulk vending machines, which have been traditionally limited to coin actuation, are correspondingly limited in the amount and variety of articles that can be dispensed. That is based primarily on price points established not by the merchandise but rather by the limitations of a coin only mechanism. Furthermore, because bulk vending machines are located at sites remote from the operator, maintenance and serviceability problems may arise without the knowledge of the operator and the machines may remain inoperative for considerable periods of time, even in high traffic areas. In addition to maintenance problems, bulk vending machines are also susceptible to vandalism and theft and untrustworthy employees with access to the machines may cheat by pilfering merchandise or coinage. Thus, current bulk vending machines and assemblies lack accountability so commonplace in the increasingly electronic business environment. Notwithstanding these problems, due in part to the colorful amusement characteristics and the entertainment nature of the coin operated bulk vending industry; it has not previously lent itself to electronics.

Electronic vending machines are well known in the vending industry. (See U.S. Pat. No. 4,967,896 describing a price memory control arrangement for an automatic vending machine incorporated herein by reference). Such machines can rely on microprocessor controls as described in U.S. Pat. No. 4,354,613 (incorporated herein by reference). However, such electronic controls and equipment are dedicated to conventional stand-alone snack and beverage vending machines. An area of single item vending that has moved from mechanical to the electromechanical combinations is a multi-cabinet newspaper vendor relying on a single centralized, CPU based, control mechanism such as that disclosed in U.S. Pat. No. 5,360,093. However, this device only selectively unlocks vendor cabinet doors and does not contemplate actual article dispensing.

The idea of an electronically controlled bulk vending assembly system of rack systems simplified assembly, rack oriented bulk vending machine appears to have escaped the industry. Such a machine would provide desirable advantages of centralized currency processing, signal processing, maximum operator flexibility. It also would facilitate establishing merchandise price controls and article price points as well as facilitating audit and accountability functions. Due to ease of structural modification, such an invention would also contemplate easy vending machine assembly configuration and proved for selection of a combination of individual bulk vending machines most suited to a particular location.

SUMMARY OF THE INVENTION

It is therefore an object of the present invention to provide a vending machine assembly and methodology that improves upon and overcomes the problems known in the bulk vending art.

It is another object of the invention is to provide an improved currency operated bulk vending machine.

Still another object of the present invention to provide a bulk vending machine having advantages of a configurable rack system coupled with easy convertibility and compatibility with existing bulk vending machines that is readily tailored to a particular physical and demographic location.

Still another object of the invention is to provide bulk vending operators with enhanced pricing, accounting, and maintenance controls.

Another object of this invention is to provide a currency base, electrically actuated bulk vending machine assembly providing retrofitting capability for existing machines.

Still another object of this invention is to provide remote telemetry relating to the condition and operability of a bulk vendor assembly.

Yet another object of this invention is to provide of dispensing bulk vending merchandise of various sizes and costs from a common control.

A further object of this invention is to provide a merchandise discharge method and system providing improved monitoring and maintenance capability. Yet another object of this invention is to provide a bulk vending system with augmented security features.

These and other objects are satisfied by an electronic bulk vending machine assembly, comprising:

a plurality of bulk vending units, each including a merchandise storage globe, a rotatable merchandise dispensing control element associated with said storage globe, a separate base including a dispensing opening and an electronic driving assembly being drivingly connected to and for imparting controlled rotational force to said merchandise dispensing control element for controlled dispensing of merchandise from said storage globe to said dispensing opening;

a control unit for transmitting an electronic actuation signal to the electronic driving assembly, said control unit being separate from and in electronic communication with each of said plurality of bulk vending units.

Further objects of the present invention are satisfied by a bulk vending dispensing machine, comprising:

a) a base;

b) a storage container for storing packets for dispensing, set on and above said base;

c) a rotatable distributing member disposed between said base and said container for selecting a discrete packet for distribution quantity of merchandise to be dispensed upon operation of said machine;

d) a dispensing passage for communicating said discrete package to an opening disposed in said base; and e) an electronically actuated cranking element operatively engaged with said rotatable distributing member to rotate said member and dispense a packet from the storage container.

Still other objects of the present invention are satisfied by an improved bulk vending machine incorporating an open topped base with a dispensing opening supporting a storage globe set thereon, a merchandise wheel distributing member disposed between the base and the globe for dispensing merchandise from the globe to the dispensing opening through a dispensing passage extending through the base, the improvement comprising:

an electronically actuated gear element operatively engaged with said merchandise wheel to rotate same and communicate an article from the globe, through the merchandise wheel, into the dispensing passage and to the opening.

Further objects of the present invention are satisfied by conversion to an improved version of a conventional bulk vending dispensing machine, including a base, a globe, a rotatable distributing member disposed between the base and the globe for distribution of a select quantity of merchandise, a dispensing passage for communicating the merchandise from the distributing member through the base and to a dispensing opening located on the base, the improvement comprising:

an electronically actuated gear element operatively engaged with said rotatable distributing member to rotate said member through a select angle for dispensing the merchandise from the hopper to the dispensing passage; and electronic communication means for communicating an actuation signal from a signal source to the electronically actuated gear element to thereby cause rotation of the distributing member.

Still other objects of the present invention concern the method for making or using the foregoing assemblies, systems, machines, and improvements as well as vending articles therefrom and method of monitoring and maintaining such vending machines and assemblies.

The vending machine assembly provided by this invention improves monitoring and, therefore, machine reliability while minimizing the labor and time required for inventory control and to maintain multiple machines in good working order.

As used herein, "bulk vending machine" is intended to embrace its ordinary meaning and in the context of the instant invention, allows for variations and deviations from same which may occur by design or as a result of special features, machining, materials, and other variables. The expression is intended to define the functionality where the storage and dispensing of a type of unique vended item occurs from a unique machine with a pre-established price and which is actuated upon the deposit of the appropriate coinage.

Correspondingly, the word "packet" is intended to embrace a functionality beyond the dictionary definition of a small amount of units or bundle. The word, as used herein is also intended to include any discrete, selected amount of article(s) ranging from one (a single piece of bubble gum or a capsule), to a collective or plurality such as a handful of small candies.

Given the following enabling description of the drawings, the inventive coin operated bulk vending assembly and system and the scope of the invention should become evident to a person of ordinary skill in the art.

BRIEF DESCRIPTION OF THE DRAWINGS

FIG. 13 is a perspective view of a version of a coin mechanism conversion plate for retrofitting onto an existing bulk vendor machine including a motor mounting bracket according to the embodiment of the invention depicted in FIG. 1.

FIG. 14 is a perspective view of a drive gear, motor, and motor bracket assembly in accordance with the invention.

DETAILED DESCRIPTION OF THE PREFERRED EMBODIMENT

Figure 1:
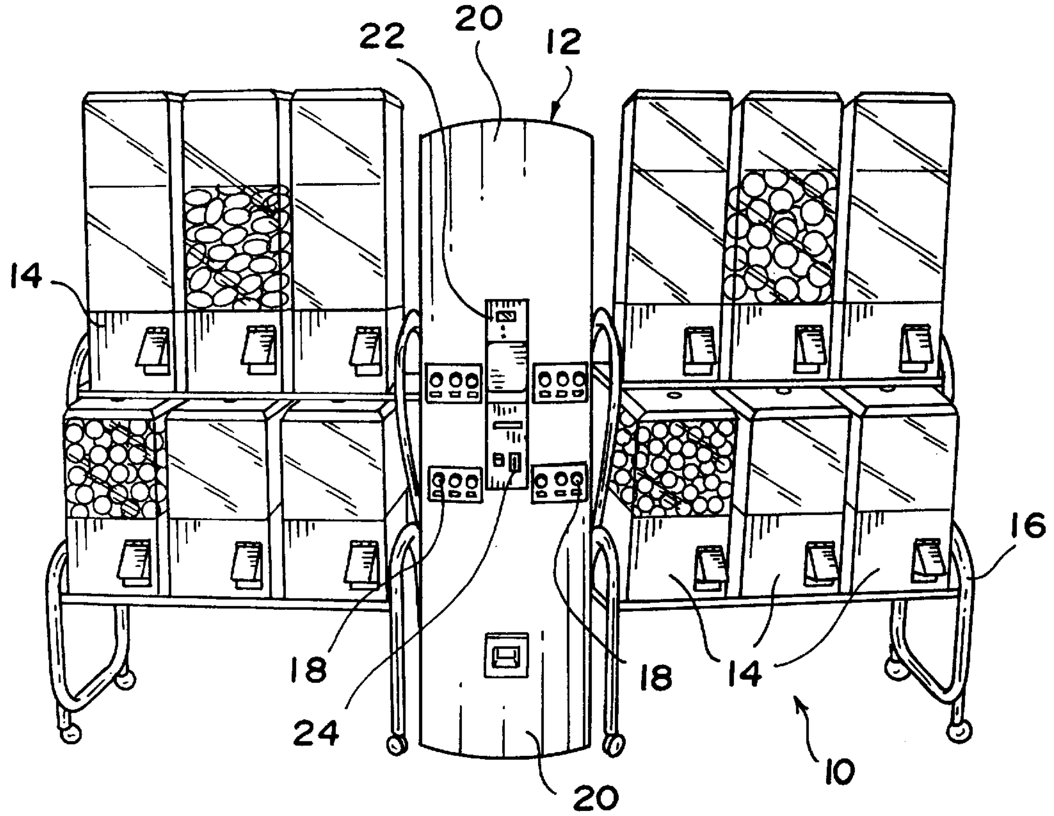
FIG. 1 is a front elevational view of a bulk vending machine assembly embodiment according to the invention.

FIG. 1 depicts an electronic bulk vending machine assembly 10 in accordance with the invention. The assembly features a central electronic control unit 12 flanked on two sides by a plurality of individual bulk vending machines 14 secured to a pair of machine rack support stands 16. Both the number and size of the individual units 14 can vary, even in respect to individual neighboring vendors to maximize operator organizational flexibility both in positioning and vending features. Exemplary existing vending machines that may be used in this invention are listed in Table 1.

TABLE 1

| Model Number/Name | Manufacturer |
|---|---|
| PN95 | Parkway Machine Corp. |
| PM Elite | Parkway Machine Corp. |
| PO 89 | Parkway Machine Corp. |
| 2001 | Parkway Machine Corp. |
| Model 77 | Parkway Machine Corp. |
| Model 88 | Parkway Machine Corp. |
| Zipper | Parkway Machine Corp. |
| Model 60 | Northwestern Manuf. |
| Oak Acorn Vendor | Oak Manufacturing |
| RB 16 (Beaver) | Machine-O-Matic |

The support stands 16 are physically attached to the central control unit 12, which in the case of this embodiment, is characterized by push button actuation. The front door 20 of the control unit 12 features a plurality of detentable, selector push-buttons 18 arrayed on the front panel around a centrally disposed currency acceptor unit 22. Disposed below the currency acceptor 22 is a coin return 24.

Figure 2:
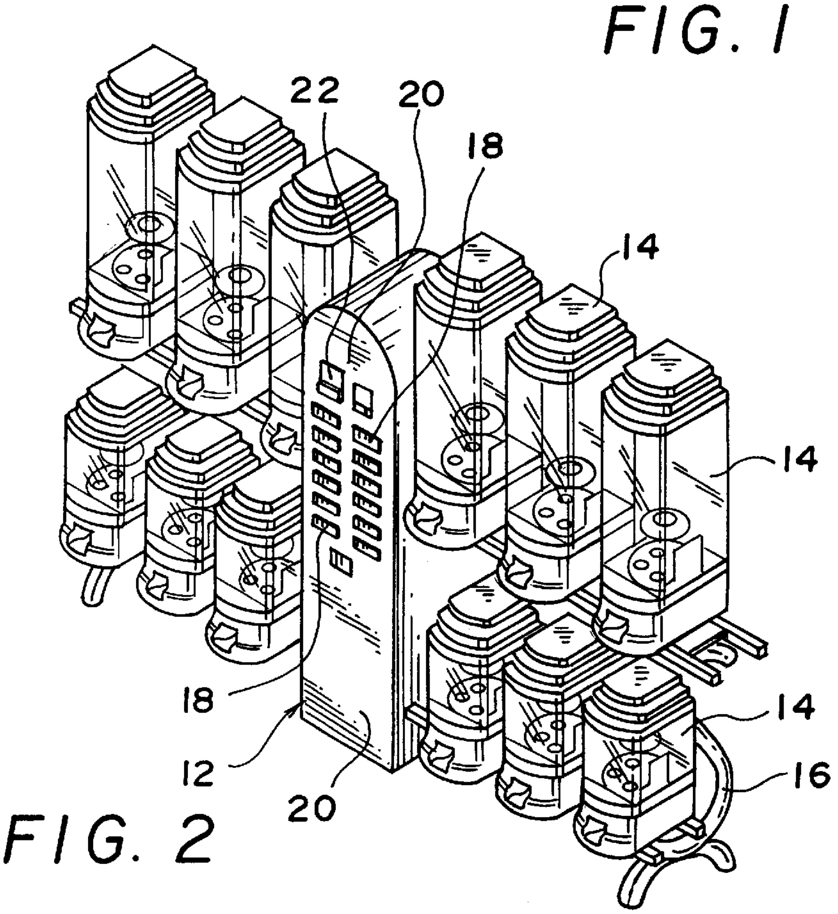
FIG. 2 is a front perspective view of a variation of a bulk vending machine assembly according to the invention.

FIG. 2 illustrates a bulk vending machine assembly of the instant invention but having a central control unit with a different configuration from that depicted in FIG. 1. Features corresponding with those of FIG. 1 are identified; namely, a front panel mounted currency acceptor 22 with columns of depressible toggle selector buttons 18. Each of the selector buttons is operatively, preferably electro-magnetically, connected to one vending machine 14 mounted on the rack 16 to actuate dispensing of a select vendible article therefrom. Disposed below the columns of buttons 18 is a coin return opening 24.

Figure 3:
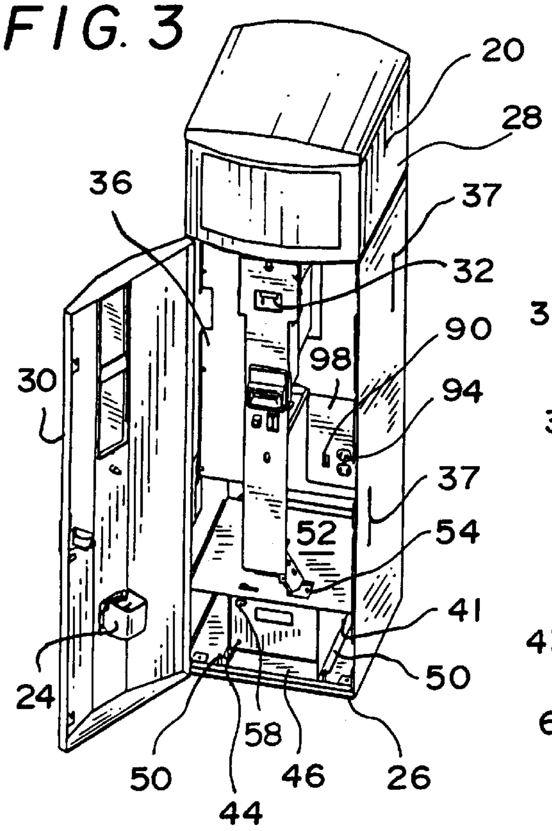
FIG. 3 is a perspective view of a central control unit embodiment according to a further embodiment corresponding to the inventions depicted in FIGS. 1 and 2.
Figure 4:
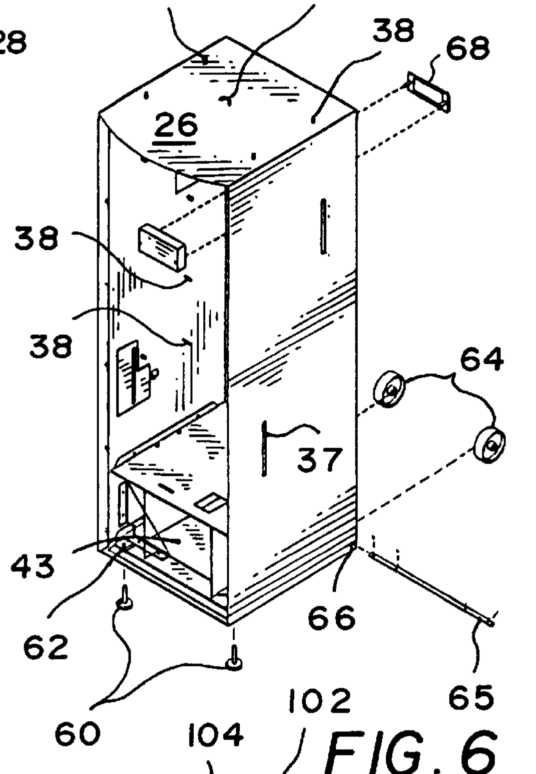
FIG. 4 is an exploded assembly view of the control unit cabinet base of the central control unit embodiment according to the embodiment of the invention depicted in FIG. 3.
Figure 5:
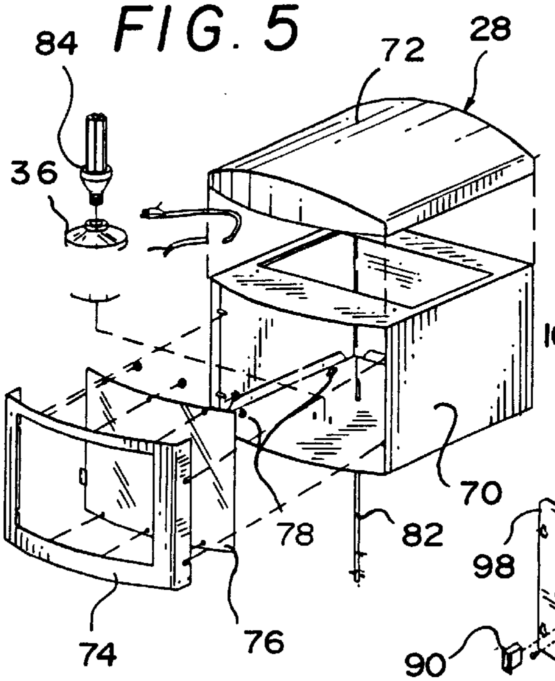
FIG. 5 is an exploded assembly view of the control unit cabinet top of the central control unit embodiment according to the embodiment of the invention depicted in FIG. 3.

A variation of a central control unit cabinet adapted to provide a digital keypad control unit is depicted in FIG. 3. The unit primarily comprises three segments; a main base cabinet 26, a top unit 28 and a hinge-mounted, latchable, front door panel 30. These segments are formed from a high strength material such as 16-gauge steel to provide adequate structural integrity and strength. Preferably, the steel sheeting is powder coated to minimize deterioration from adverse environmental factors and vandalism. Suitable non-metal materials possessing desirable functional attributes of powder coated steel (e.g. selected polymer compositions and composites) may be substituted for the steel.

The main cabinet 26 provides the rigid and strong housing for the power and control units necessary for actuation of the invention as well as the means for securing the bulk vending machine rack stands in assembly form. The cabinet houses the microprocessor-containing circuit board, the main controller bracket 34 mounted to an internal electrical component vertical support panel 36, currency acceptor components, mechanical and electrical connections for the currency acceptor components, and the coin vault. It also features rack-securing slots 37 formed in each sidewall. The slots 37 are relatively long to facilitate vertical height adjustment of the rack stands relative to the cabinet. The support panel 36 is dimensioned to correspond to the interior width of the cabinet 26 to be nested therein. In the present illustrated embodiment, the panel 36, is secured to the interior side walls of the cabinet 26 by mating a series of projecting pins 38 to a plurality of corresponding complementary L-slots 40 formed on peripheral flange 42 of the support panel 36.

The base of the cabinet 26 contains a lower chamber 41 separated by a steel ceiling panel 52 from the upper portion of the container 26. The coin vault 43 is a steel box for housing the vending assembly coin box 44. As illustrated, the box forming the vault 43 includes two steel sidewalls that extend between the ceiling panel 52 and the floor of container 26. The side panels are physically attached to both the ceiling panel 52 and a pair of upstanding, parallel support beams 50 affixed along the container floor 46. The support beams 50 reinforce the floor 46 and raise the coin box vault 43 above the floor of the container. The vault translatably receives the coin box 44 and may include features such as tracks or some other friction reducing means to facilitate translation of the box from the vault.

The vault-ceiling panel 52 is permanently attached to the interior of the cabinet 26 to define an upper section and the lower, vault sections. Therefore, it also incorporates a coin communicating feedthrough aperture 54 for communication of coins from the currency acceptor into the underlying coin box 44. Finally, the ceiling panel 52 includes a means for locking the coin box within the vault. In the illustrated embodiment, a locking combination is established by a lock lug receiving slot 56 dimensioned to receive a lug from key actuated lock 58 established in the coin box. This arrangement provides a means to prevent unauthorized access to and removal of the coin box from the vault even when the front door 30 is open.

The container 26 also includes features to facilitate secure positioning of central control unit 12. Reinforced, threaded holes 62 located near the front of and at each side of the cabinet floor 46 are adapted to receive threaded leveler guides 60 that provide height adjustability. The back of the cabinet features wheel-receiving recesses for retaining shaft mounted roller wheels 64. A shaft 65 passes through apertures 66 formed along the back bottom portion of the lower chamber 41, through the wheels and is secured with a plurality of locking rings 67. The back of the cabinet 26 also includes a feedthrough for electrical power cord and a handle 68 for grasping and tilting the unit 12 to roll on the wheels.

The top unit 28 of the central control unit 12 features a hollow display weldment 70, a dome top 72, a display front 74 and a display lens 76. The top unit 28 mates with main cabinet 26 when pins 38 pass through pin holes 78. A threaded lock rod 82 compression clamps the top 72 to weldment 70 and to the main cabinet 26 by securing it in feedthrough 80 formed in the top of the cabinet 26. In this manner the individual segments are combined to form a secure unitary structure but also permit stacking of additional top units above the main cabinet, when desirable. That feedthrough also accommodates an electrical conduit from the main cabinet to the top unit. The top unit may incorporate a static (illustrated) or dynamic display to attract potential purchasers or to provide advertising. As illustrated the top unit includes a light 84 and light fixture 86 that illuminates a translucent display lens 76 framed by the display front 74.

Figure 6:
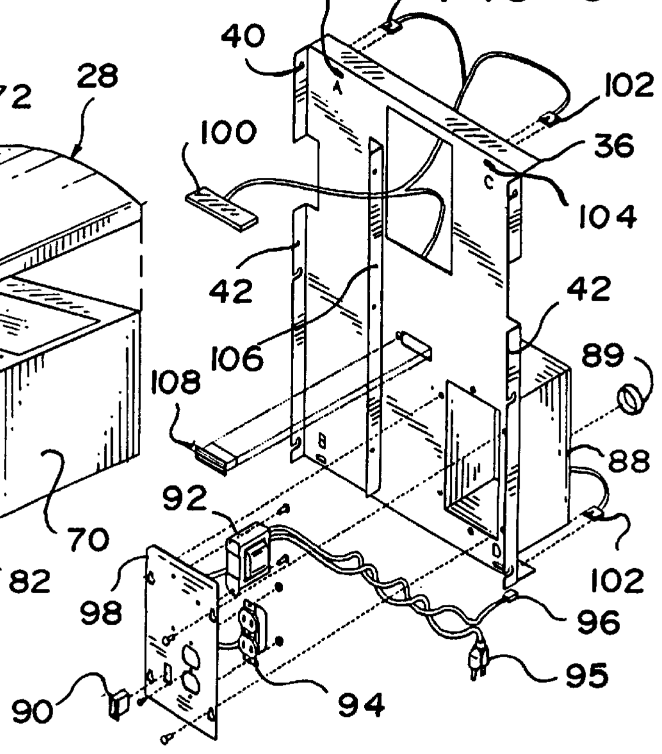
FIG. 6 is an assembly view of control unit mounting panel for mounting in the cabinet base of the central control unit embodiment according to the embodiment of the invention depicted in FIG. 3.

Referring to FIG. 6, the electrical component mounting panel 36 provides secure mountings for the electrical junction box 88 which houses circuit breaker 90, transformer 92, and electrical outlet 94 along with associated power cord 95, wires, and pin connector 96. The junction box 88 includes a power cord feedthrough protected by bushing 89 and is covered by a panel 98 which also serves as a seat for the circuit breaker 90. The main pin connector 100 is connected to power pin connector 96 to provide electricity to the control panel and to communicate electrical signals to the shelf pin connector harnesses 102 seated in pin harness openings 104 located proximate to each of the corners of the panel 36. A longitudinal hinged, L-bracket 106 is welded vertically only the front face of the panel next to centrally located permanent magnet 108, both of which serve to secure the currency acceptor unit 22.

Figure 7:
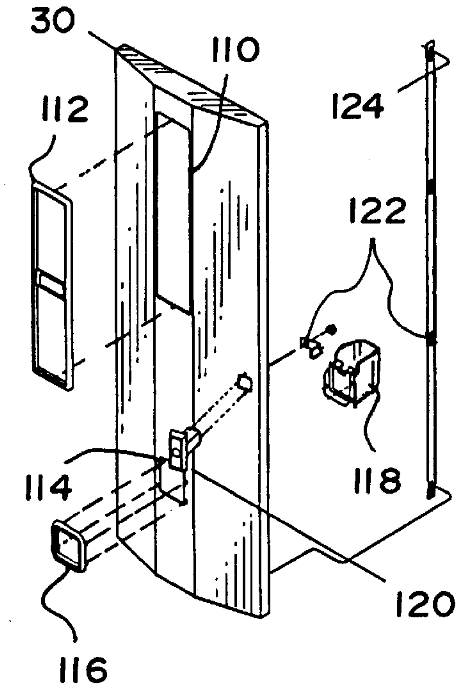
FIG. 7 is an assembly view of the front door panel and latching arrangement of the central control unit embodiment depicted in FIG. 3.

In FIG. 7, the hinge mounted steel door 30 that secures the main cabinet 26, is illustrated. Steel door 30 includes a central vertically oriented currency acceptor aperture 110 which is framed by a coin acceptor bezel 112. Disposed below the aperture 110 is a second aperture 114 framed by coin return bezel 116 that serve to secure coin return cup 118 under the currency acceptor unit 22. The door also includes a T-handle lock 120 that rotates cam 122 that translates a locking latch bar 124 to engage complementary lug structures within the cabinet 26.

Figure 8:
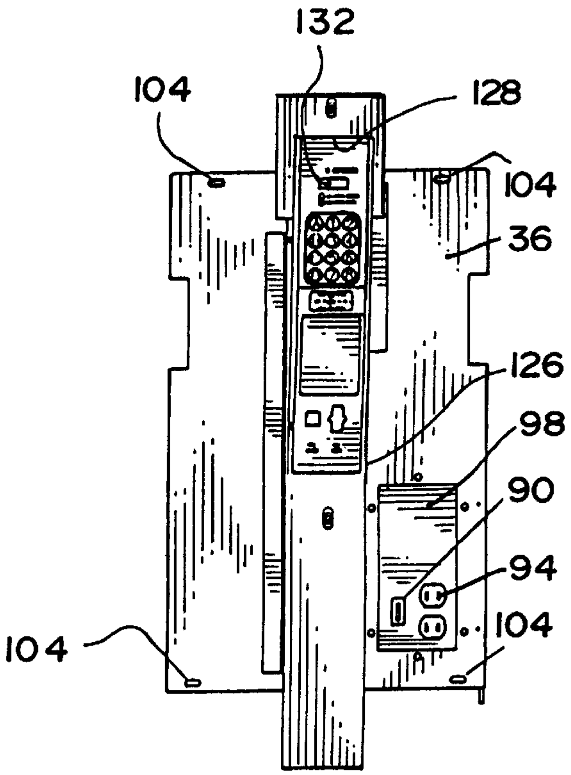
FIG. 8 is a front view of a control unit housing of the embodiment of the electronic controller and keypad as mounted on a panel according to FIG. 6 in accordance with one embodiment of the invention as depicted in FIG. 3.
Figure 9:
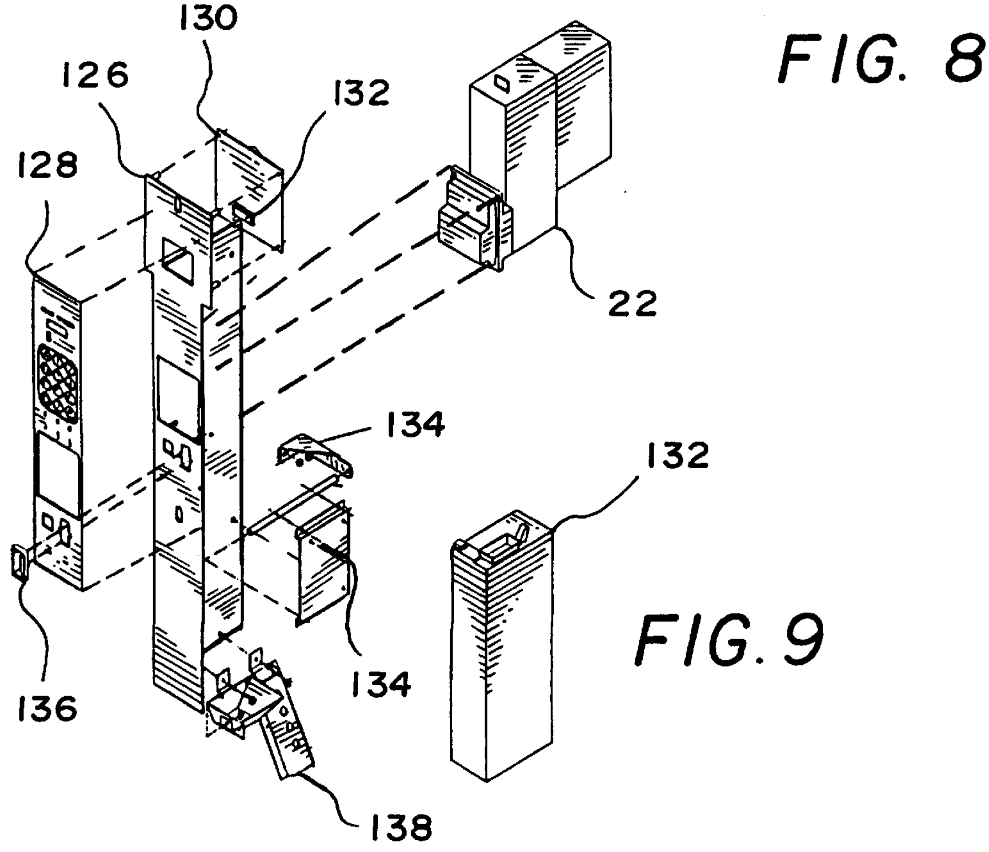
FIG. 9 is a perspective assembly view of an electronic controller and keypad including currency acceptor elements in accordance with the embodiment according to the embodiment depicted in FIG. 3.

A detailed view of the currency acceptor mechanism is illustrated FIGS. 8 and 9. The currency acceptor, in the illustrated embodiment includes both a bill validator of the type disclosed in U.S. Pat. No. 4,880,096 and a coin acceptor of the type disclosed in U.S. Pat. No. 4,739,869 and its cognate Canadian Patent 1,251,862 (the subject matter of all being incorporated herein by reference). The L bracket 126 secures the keypad 128 on its front and preferably is mounted to the support panel 36 along bracket 106 in a manner to permit pivoting for easy access to the supported components. It also secures the microprocessor-controlled circuit board 130 on its backside. The circuit board 130 includes an electronic display (either Liquid Crystal or LED) 132 facing outward for visual access from the front. The currency acceptor elements include the bill acceptor mounted to the L bracket 126 and coin acceptor 132 mounted to the L bracket 126 with the bracket 134. Preferably, the bracket 134 is formed of a ferrous metal so that it is releasably attracted to the magnet 108 attached to the support panel 36. The coin acceptor 132 is in coin communication with coin receiving slot member 136 mounted on the front of the bracket 126. The coin dispensing chute 138 is disposed below the coin acceptor 132 to pass coins from the acceptor to the coin box in vault 44.

Figure 10:
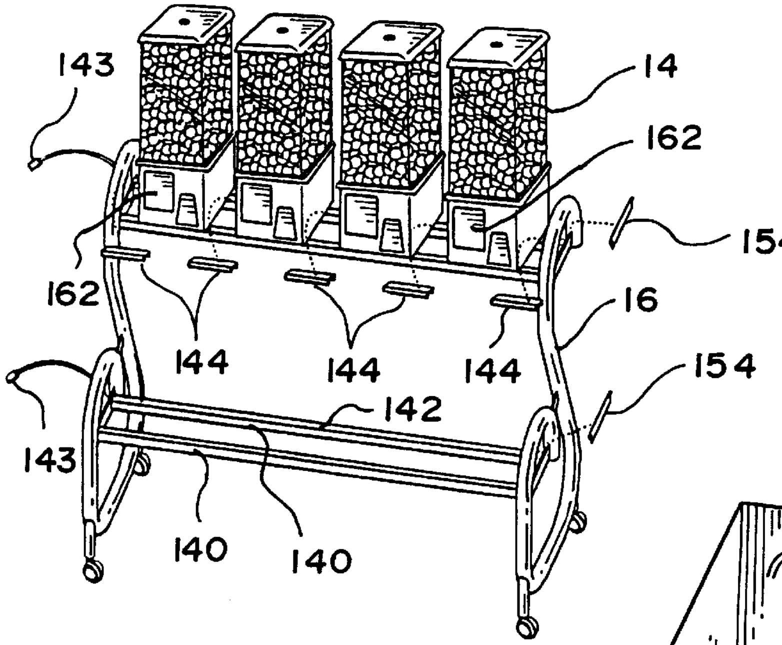
FIG. 10 is a perspective partial assembly view of a multi-machine stand and illustrative bulk vending units according to the embodiment of the invention depicted in FIG. 1.
Figure 11:
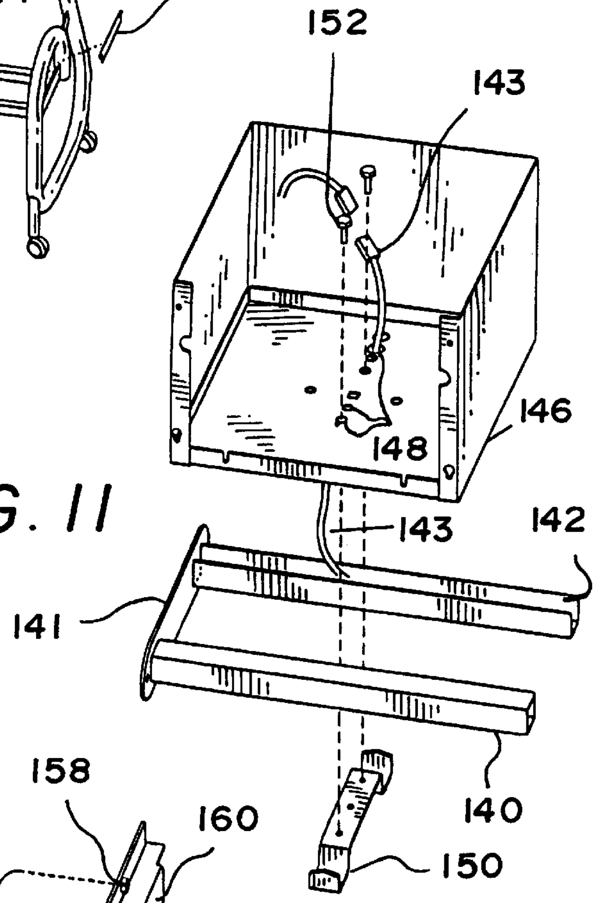
FIG. 11 is a perspective assembly view of a bulk vending machine base and mounting bracket adapted to be used in the embodiment of the invention depicted in FIG. 1.
Figure 12:
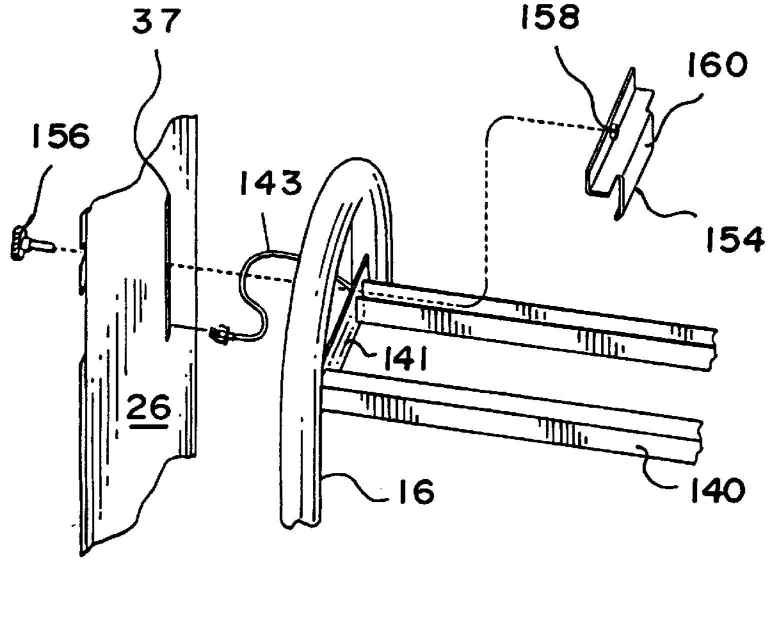
FIG. 12 is a perspective partial assembly view of a multi-bulk vendor machine stand and central control cabinet according to the embodiment of the invention depicted in FIG. 1.

Turning now to the rack and machine attachment structures, FIGS. 10–12 show an array of machines 14 positioned on one shelf of a stand 16 and respective attachment means therefor. The stand 16 may be of any conventional type but, preferably, to accommodate the wiring and harnesses required for the instant invention, it is a modified form of the stand depicted in Design Patent 381,169 for a stand, the disclosure of which is incorporated by reference herein.

The multi-machine stand 16 features at least one channel 142 formed in one of the lateral shelf pair members to recess wire/harness cable 143. A plurality of channel caps 144 are seated over the channels 142 in a spaced apart relation leaving gaps for passage of the wire/cable 143 but coacting with the base 146 of the bulk vending machines to form a complete, integral channel cover extending over the entire length of the channel 142. The base 146 includes a plurality of preformed holes 148 of various sizes. Some of the holes 148 comprise feedthroughs for passing the cable harness 143 into the machine base, and others are for mounting a particular bulk vending machine 14 to a shelf of the stand 16. Following positioning of a machine on a shelf and overlying a pair of caps 144, machine bolts 152 are threaded through the machine base 146 to a machine clamp bracket 150 that clamps over the shelf members. Because the bolts are secured from the inside of the machine base, absent significant force, the machine base cannot be dislodged from the shelf and the cable protecting channel caps are also secured. It is also possible to retrofit conventional vending machine stands by forming the appropriate mating holes between a machine base and stand shelves.

The rack stand attachment relies on a stand clamp bracket 154 being compression clamped to the side of the central control unit 12. When the rack stand 16 is moved (caster roller facilitated) to a position contiguous to slots 37 in cabinet 26, the wire harness cable 143 is passed through slot 37 for connection to the appropriate wire pin harness 102 and the stand clamp bracket is aligned with the slot. The clamping knob 156 is screwed from the inside of the cabinet 26 through the slot 37 and into the mating threaded hole 158 formed in the stand clamp 154. The downwardly projecting engagement lip 160 compressibly clamps over the stand cross support strut 141. This is repeated on for the other shelf thereby establishing two attachment points per stand to the central control unit 12. To minimize risk of tampering, the stand should be clamped to the control unit prior to clamping the interior-most bulk vending machines to the shelves.

FIG. 13 relates to one version of the motor mounting bracket assembly for each individual machine which is mounted to a cover plate 162 that is intended to substitute for a conventional coin receiving mechanism located on the machine base. The cover mounting plate 162 can be formed integrally with a machine base or may be retrofitted to the front of a preexisting bulk vending machine in the place of the coin mechanism. Consequently, the particular configuration and dimensions of the plate will vary depending on the machine on which it is used. However, it is preferable that the plate 162 be formed of relatively heavy gauge steel (e.g., 12 gauge). When required for retrofitting, the plate may include its own base attachment elements of, as illustrated, may cooperate with the motor mounting bracket 164 to clamp the plate 162 on the front of a vending machine (See FIG. 1). For the purpose of attaching bracket 164 to plate 162, threaded mounting lugs project interiorly from the back face of the mounting plate to cooperate with complimentary holes 167 formed along the vertically directed attachment flange 168. The flange 168 is longer than the width of plate 162 and features offset tongues 170 that are dimensioned to engage the lip of the base established by the opening for the conventional coin mechanism. Once positioned over that opening and onto the lugs 166, the bracket 164 is secured to plate 162 and the tongues 170 are clamped against the lip using threaded nuts. The bracket 164 also features a plurality of spaced motor housing attachment holes 172 and a non-circular gear shaft opening 174.

The bracket 164 defines a space to secure the electrically powered vendor motor 176 on the backside/interior wall of the bracket. Such geared electric vendor motor and housing is described in U.S. Pat. No. 5,172,605, the subject matter thereof being incorporated herein by reference. The motor unit/housing 176 includes electric motor and operational circuitry 178, a plurality of interlinked spur gears and a non-circular drive shaft (rectangular, preferably) receiving bore for journalling the drive shaft 180 of the merchandise wheel drive gear 182.

The motor housing 176 is attached to the bracket 164 with screws passing through spaced holes 172 in the bracket. In this manner the main drive gear 182 is secured at a select distance between the bracket 164 and the plate 162 to insure proper gear interengagement with the merchandise wheel 200 seated in the contiguous machine hopper. Spacing and alignment of the drive gear 182 within the bracket varies depending on bulk vending machine type to bulk vending machine type. However, repeatable spacing can be achieved by mounting the drive (spur) gear 182 at a particular point on the gear shaft where the gear shaft 180 is selectively configured to correspond to the cross-sectional configuration of the motor bore. When so dimensioned, the shaft 180 journals within the motor drive bore and has a length that extends to a point abutting the plate 162. Thus, misalignment problems leading to machine breakdown can be minimized. By so aligning the gear unit to journal within the receiving bore 174 and to engage the peripheral gearing 202 of the merchandise wheel, the appropriate rotational forces are imparted from the motor to the merchandise wheel for vending merchandise.

It should be apparent to the skilled operator that due to the wide variety of bulk vending machines, it is not possible to entirely standardize the dimensions of the brackets, plate, and spur gear. Furthermore, it should also be apparent that there is no requirement to mount the motor within the base at any particular location. Subject to the caveat that the drive gear is able to impart the appropriate rotational force to the merchandise wheel, the motor can be mounted anywhere within the base, e.g., the back or sidewalls of the machine base. Thus, the important element in this relationship is the functionality of interengagement between the gear 182 and the merchandise wheel, not the particular dimensions or placement of the motor required by a specific hopper configuration.

New equipment designed particularly for use in an assembly contemplated by this invention, dispenses with the need for conversion (and therefore, plate 162). However, some provision for securing the motor mounting bracket 168 within the machine in a manner where the motor driven gear is in operative engagement with the merchandise wheel, is required. In relation to retrofitting existing machines, some operators may prefer to retain the crank handle (albeit in a non-actuating mode) on the front of the vendor for aesthetic purposes or even for the amusement of purchasers who may turn the crank handle.

While many of the components and structures used to establish a working version of the inventive assembly, Table 2 identifies off-the-shelf components that were employed in that construction:

TABLE 2

| Component Description | Manufacturer/Supplier |
|---|---|
| BA32R Bill Acceptor | Coinco |
| 9302-GX Coin Changer | Coinco |
| PC Controller/Display 407516 | Coinco |
| Shelf cabling | Mercury Electronics |
| Pin connectors 43025-1000, 43030-0007, 70107-0036, 70066 50-57-9402, 70058 16-02-0102, 16-02-0114, 43020-1000 43031-0007 | Molex |
| Pin connectors 610601-1, 640917-1, 2-520102-2, 2-520183-2 2-520181-2, 2-520273-2, 53241-2, 31894 | AMP, Inc. |
| Pin connector SVT 17534 | Belden Electronics, Inc. |
| Bulk Vendor Motors Part D27-2406-3 | Merkle-Korff industries, Inc. |
| LED SSI LXH1090SRC/C | Lumex Opto/Components, Inc. |

Figure 15:
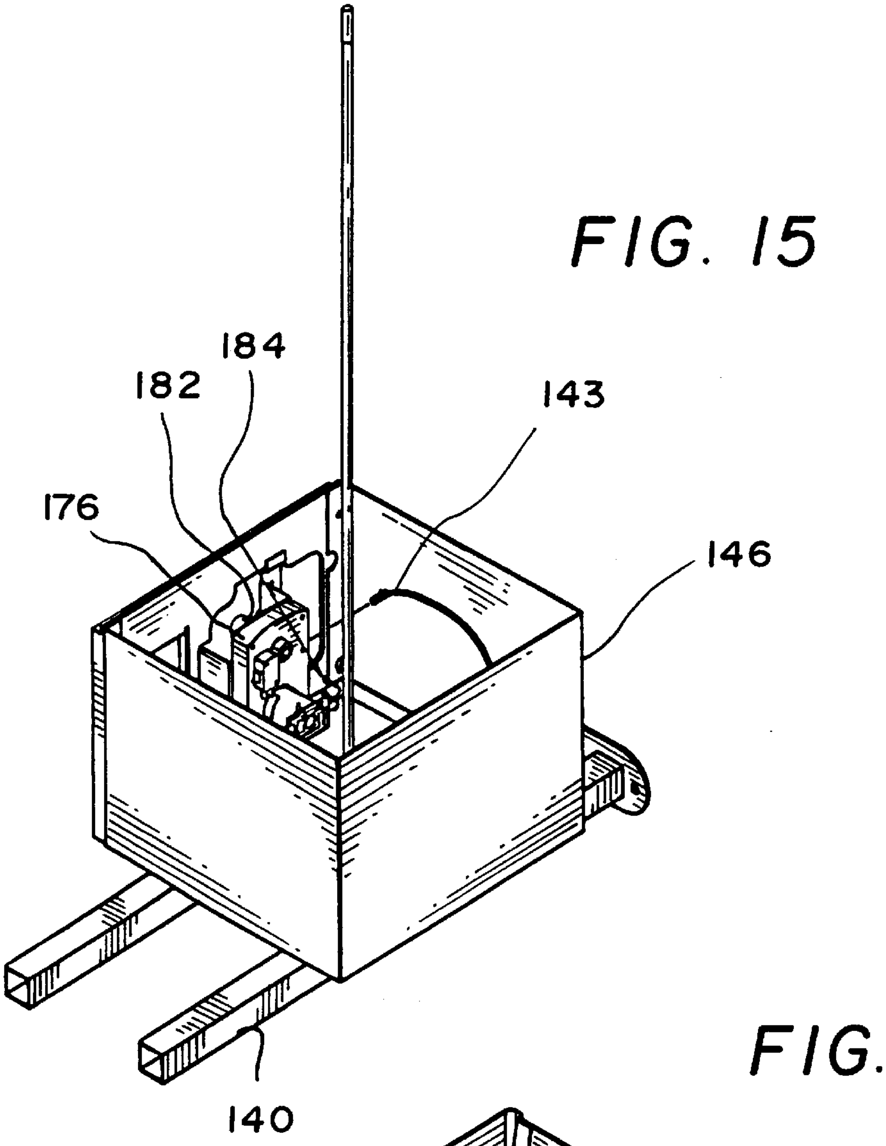
FIG. 15 is a perspective view of a drive gear, motor, and motor bracket assembly affixed to a vending machine base as mounted on a rack shelf in accordance with the invention.

In FIG. 15 a drive gear 182, motor 176, and motor bracket assembly affixed to a vending machine base 146 as mounted on a rack shelf 140 in accordance with the invention. Although not depicted, the front plate may include an LED or other visible or audible indicator that is activated upon user actuation corresponding to that particular bulk vendor. Also it is possible to incorporate a push button or other actuation signal transmission means on the front of the bulk vendor plate which can act independently or in conjunction with the central control unit to confirm the actuation instructions to the central control unit. Such buttons would be located on each or on selected ones of said units where each button would be in electronic communication with the control unit.

Figure 16:
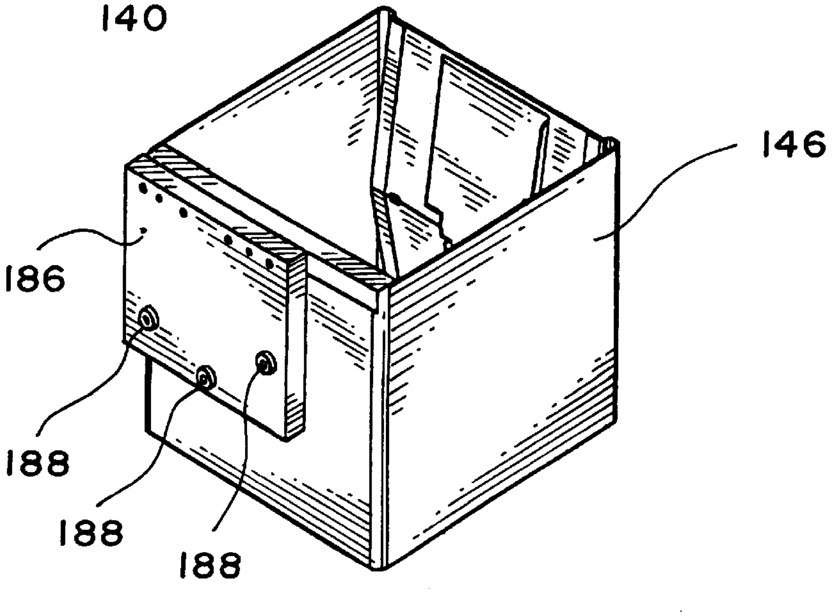
FIG. 16 is a perspective view of a drill jig on a machine base for converting one type of existing bulk vending machine for use in the invention in accordance with the invention.
Figure 17:
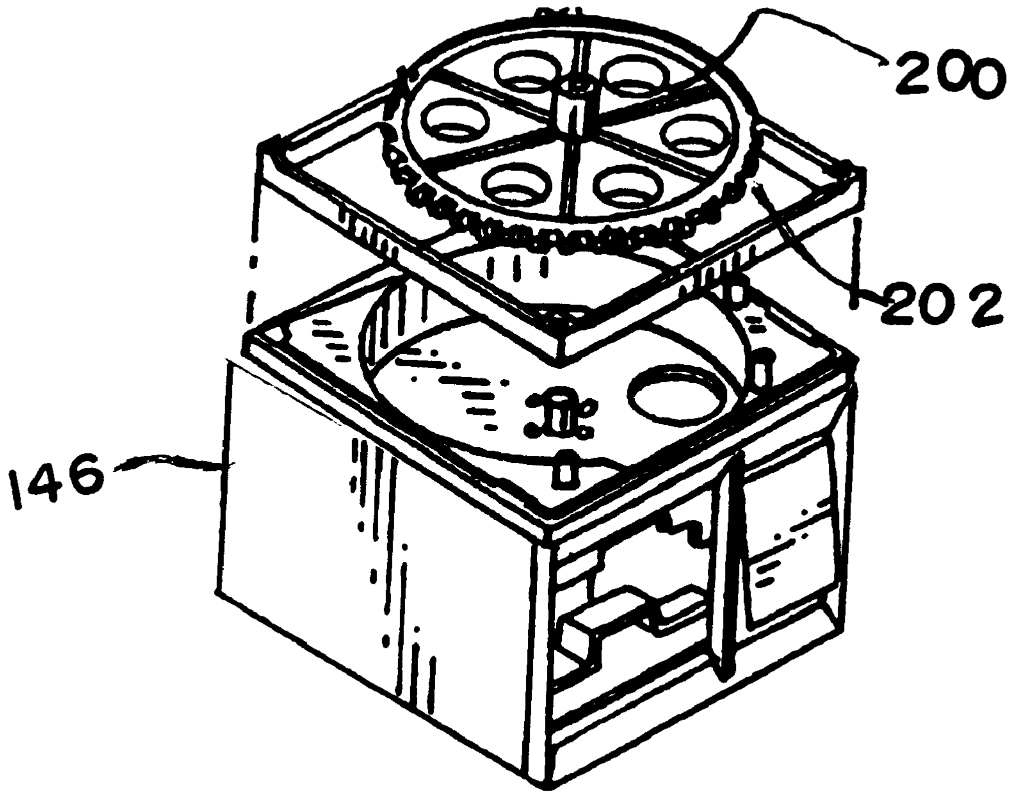
FIG. 17 is an assembly view of a rotatable merchandise wheel in combination with the base of a bulk vending machine hopper in accordance with this invention.

FIG. 16 represents a drill jig 186 which is placed on a machine base 143 for converting one type of existing bulk vending machine, in this case a PN95. This jig 186 includes multiple drill guide holes 188 which are both pre-sized and pre-positioned to permit the motor/motor bracket to be riveted to the base 146 and positioned so as to insure proper interengagement of the motor drive gear 182 with the gearing on the merchandise wheel. The particular configuration of such "field kit" multi-hole jigs will depend on the particular machine requiring conversion and whether a jig is required at all (For example, no jig is required when the motor is mounted on the front plate as depicted in FIG. 13). Field kit jigs may also provide drill guide holes for the passage of the wire harness and the stand clamp bracket. On the floor of the base.

Given the foregoing structural descriptions of the various aspects of the present invention in the illustrated embodiment, the following provides a brief discussion of the installation, utilization and operation, of the above described.

Following selection of the individual bulk vendors (retrofitting when necessary), the rack stands 18 and machines must be assembled. The appropriate cables/wiring harness must be installed in the slotted channel. The right and left side rack assemblies will be mirror opposites and each will include the cable ends and shelf end cover guards at opposite ends. The shelf harnessing, corresponding to the number of machines to be installed on a shelf is placed in the channel and the main connector passed through the feedthrough in the upright next to the main control unit. An appropriate number of channel caps is selected to cover any open area of the channel and conceal the harnessing between machines.

After preparation of the racks is complete, then the machines must be secured to the shelves. The wiring harness must be passed onto each machine and plugged into the connector associated with the motor in the base of the machine. Channel caps of appropriate length are placed over the open channel on the shelf on each side of the machine and the machine positioned on the shelf in a manner to overlap the channel caps. The machine is then clamped onto the shelf using the metal mounting bracket under the base of the machine and about the shelf threading the connecting bolts from the inside of the vending base into the mounting bracket. Properly installed, the machine will positionally secure the shelf channel caps and conceal the harnessing lying in the channel After assembly of the select number of bulk vending machines 14 on the rack stands, the machine/stand array is attached to the side of the control unit cabinet 26 using the rack mounting knobs and mounting brackets. First, the wiring harness is passed through the appropriate slot 37 in the side of the control cabinet. Next, for each rack shelf, a rack clamp must be positioned around the shelf end plate and the rack knob threaded from the inside, through the slot 37, and into the clamp.

Following completion of the foregoing, each of the wiring harnesses is attached to the appropriate plug-in pin connector located at the four corners of the on vertical support bracket 36. Typically, the upper left connector is used for the machines on the upper left rack; the lower left connector is used for the machines on the lower left rack, etc. Once completed, the mechanical assembly aspects of the system should be complete.

The next steps relate to electronic operation. The currency acceptor (as illustrated the bill acceptor and the coin changer) must be initialized. Initially, some coins should be placed in the changer, but under normal operating conditions, the coin changer is self-filling.

To set the machine, it is necessary to unlock and open the door 30 of the central control unit 12. To access the control board and currency acceptors of the main control panel, pivot the hinged panel to overcome the magnetic force holding it in the closed position. To program the unit, it is first necessary to enter the service mode by pressing and releasing the mode button located on the control board. (Toggling the mode button again will exit the service mode and return the control board to the sales mode.) The unit is provided with a fail-safe feature to prevent accidents. If the programming sequences are not initiated within 25 seconds as detected by an absence of keypad activity, the control board automatically reverts to the sales mode.

The first display is of diagnostic indicators on the digital display. These will be displayed until entry of subsequent programming functions. Such diagnostics include the number of configured motors, multi-drop bus errors, defective or jammed motors, etc. Examples of various programming functions, include for example, the following permanent modes:

1) Coin Dispense—This mode is used to empty the coin tubes of the changer.
2) Motor Count.—This mode displays the number of motors configured corresponding to the number of individual bulk vending machines 14 installed on the racks 18;
3) Accounting—In this mode the total vend count and the total cash count is displayed, preferably both as cumulative totals which are not resettable to both minimize tampering and facilitate tracking the total number of vends/money collected by each respective unit.
4) Setting Prices—This mode provides for operator flexibility by allowing each machine to be set at a unique vending price point. After identifying a particular machine, the vending actuation price is set by pushing the "↑" arrow key to increase the price displayed on the LCD or LED display and the "↓" arrow to decrease the price.
5) Test Vend—This is a currency-less transaction mode employed to confirm proper operation of the electrical connection between the selector and a particular machine. Dispensing of a product from the appropriate machine indicates a successful test. Failure is indicated on the display.

The control pad also permits an operator to customize each vending machine assembly by setting the following optional modes:

1 Force Vend—When activated, the Force Vend requires a purchase to be made once the customer has inserted money into currency acceptor. No change is returned until a selection is entered on the keypad. When deactivated, the customer may push the coin return and receive money back in change without making a purchase.

2. Bill Escrow—This mode determines if the customer will receive the original currency bill or change. It is related to the Force Vend option insofar as, when activated, the Force Vend mode overrides the Bill Escrow mode.

3. Multi-Vend—This optional mode permits the operator to set a price point at which change is automatically returned to the customer following a vend. Assuming a customer makes a purchase but does not use all of the deposited money deposited in the machine, the amount remaining in "escrow" is displayed and may be used to make an additional purchase or, at the election of the customer, can be retrieved the remaining balance by pushing the coin return button. The escrowed amount will also be returned automatically after 25 seconds if no subsequent action (selection or deposit) is made.

5. Free Vend—This option puts the entire assembly in a free play operational mode and over-rides any price settings. The above-described bulk vending machines are particularly useful in multiple machine/rack arrangements and are readily adaptable for a variety of potential applications including electronic vending. A bulk vending assembly of the type contemplated by this invention may also incorporate a number of various options to facilitate troubleshooting, minimize vandalism, and assist with data collection and inventory control.

Each unit may include an electronic optical or electro-optical detector associated with the dispensing opening of each merchandise wheel to confirm the presence or absence of a vend. A vend failure can be caused by any number of problems that face bulk vending machine operators using conventional machines. However, jamming problems etc. can be detected, confirmed, and corrected much more quickly given the appropriate telemetry which can be accessed on site or remotely. For example, if a product jams in the merchandise wheel, it will not only prevent a vend but may prevent the selected vendor motor from turning. This failure could be detected using the vend confirmation sensor and relayed to the operator by on-site interrogation or automatic interrogation and remote information transmission using a telemetry transceiver system located in he central control unit. Such information transmission may relate to the entire assembly or may address individual units. Such information may include the operability of the machine, the number of vends, the amount collected since the last refill, etc. which is useful for maintenance and inventory control.

For example, as in the case of conventional machines, coins can become jammed in the coin acceptor which must be dislodged to permit full operation. This sub-optimal condition may be detected by the machine and relayed to an appropriate central control.

Another concept relates to security. A digital camera may be installed in the domed top section that allows for period scheduled recordation of traffic about the unit and may be associated with sensors to activate upon the occurrence of any unauthorized or unlawful activity involving the machine. Thus, machine is capable of storing or transmitting information that provides the operator with demographic characteristics of the user population and/or enhanced security.

The following discussion concerns the electronic accounting or audit system and method contemplated to be used with the above-described systems. As contemplated, the auditing system used in connection with the invention is fully automated and permits data gathering with complete cash and audit detail reporting capabilities. Once established, the audit accounting system provides detailed information about the vending activity of the entire system as well as about the individual bulk vending machines with which it is associated. Typically, the auditing system will enable production of reports, for example, of total money in the coin changer, cash box, and/or bill acceptor, the total number of vends by the system, per machine, and by selection. So long as fundamental system information is present, e.g., the machine serial number, the identification of the bulk vending machines the name of the location, the route number and the time increment (day, week or month), the operator may retrieve the information on location or remotely through an appropriate telecommunications link.

Preferably, for security reasons and consistent reporting operations, the audit function are accessible to only Key operator personnel and the software is designed to permit access to any one site one at one time. The software is installable on a conventional PC meeting minimum operating requirements and is provided with an appropriate link for receiving the data from the central control units. There are several interrogation hardware options including hard wiring to the audit computer, telephone-line/modem linkage, radio transceivers, satellite communication uplink-downlink hardware, and even a hand held portable probe including an infrared transmitter or a serial port. Once the data is transferred, the particulars of its use depend on the specifics of the operator's requirements and therefore, are not detailed here.

The above-described embodiments have been directed to currency receipt only. However, the invention contemplates other redemption faculties. For example, the invention can be used for redeeming tickets or other transactable media such as that used in entertainment arcade centers, at charity events, and the like.

Given the foregoing, variations and modifications to the invention should now be apparent to a person having ordinary skill in the art. These variations and modifications are intended to fall within the scope and spirit of the invention as defined by the following claims.

What is claimed is:

1. An electronically actuated bulk machine for dispensing articles, comprising:

means for storing a plurality of articles where the articles, said means for storing including a generally open bottom;

rotatable means for controlled distribution of articles from the open bottom of the means for storing, said rotatable means for distributing selectively dispensing articles; a base means for supporting said means for storing, said means for controlled distribution being seated within said base means and being rotatable within said base means, said base means having a bottom wall and side walls, and a top accommodating a selective operating assembly mechanically linked to said means for controlled distribution, and an article dispensing opening being located on said base; and electronically actuated means in electronic communication with a currency receipt device for rotating said rotatable means for controlled distribution mechanically linked thereto and cooperatively engaged therewith to rotate through a select arc upon selective actuation thereof.

2. The dispensing machine according to claim 1 where the rotatable means contains chambers where the arc corresponds to the rotational equivalent of one chamber.

3. The dispensing machine according to claim 2 where said means for distributing is a multi-chambered, wheel having a diameter corresponding to the open bottom of said means for storing and rotatably mounted relative thereto for dispensing one article at a time and said wheel includes gearing disposed about its periphery, and said means for storing the plurality of articles comprises a hollow globe having an opening formed at its top and a lid corresponding in size to the opening where the lid is securable thereto to seal the opening.

4. The vending machine of claim 2 where the electronically actuated means is a motor mechanically linked to said means for controlled distribution by a spur gear mounted on a non-circular shaft extending between the motor and controlled distribution means, said shaft being able to impart rotational force from the motor to the means for controlled distribution.

5. The method of assembling the bulk vending machine according to claim 1 including the step of connecting the control unit to said vending machine.

6. The method of using a vending machine according to claim 1 including the step of inserting money into the control unit and selectively actuating said bulk vending machine.

7. A bulk vending dispensing machine, comprising:

a) a base with an open top;

b) a storage container for storing packets for dispensing, set on and above said base;

c) a rotatable distributing member seated and rotatable within the open top of said base and below said storage container for selecting a discrete packet for distribution quantity of merchandise to be dispensed upon operation of said machine;

d) a dispensing passage for communicating said discrete package to an opening disposed in said base; and e) an electronically actuated cranking element in communication with a currency receipt device and operatively engaged to said gearing of said rotatable distributing member to rotate said member and dispense a packet from the storage container.

8. The dispensing machine of claim 7 where the rotatable distributing member is a molded plastic merchandise wheel and includes peripherally disposed gearing.

9. An improved bulk vending machine incorporating an open topped base with a dispensing opening supporting a storage globe set thereon, a merchandise wheel distributing member rotatable within the base disposed within the base and under the globe for dispensing merchandise from the globe to the dispensing opening through a dispensing passage extending through the base, the improvement comprising:

an electronically actuated gear element in electrical signal communication with an electronic currency receipt assembly and operatively engaged with said merchandise wheel to rotate same within the base and communicate an article from the globe, through the merchandise wheel, into the dispensing passage and to the opening.

10. The improved bulk vending machine according to claim 9 where the electronically actuated gear element includes an electric motor and an electric power source.

11. The improved bulk vending machine according to claim 10 where the electric motor is concealed within the base and is in electronic communication with an actuation signal source that provides a signal to provide power to rotate the motor which in turn rotates the merchandise wheel.

12. In a conventional bulk vending dispensing machine, including a globe mounted on a base, a rotatable merchandise wheel with gearing disposed between the base and the globe for distribution of a select quantity of merchandise said rotatable merchandise wheel being seated within and rotatable within said base and, a dispensing passage for communicating the merchandise from the distributing member through the base and to a dispensing opening located on the base, the improvement comprising:

an electronically actuated gear element in communication with a currency receipt device and operatively engaged with said rotatable merchandise wheel gearing to rotate said merchandise wheel through a select angle for dispensing the merchandise from the hopper to the dispensing passage; and electronic communication means for communicating an actuation signal from a signal source to the electronically actuated gear element to thereby cause rotation of the merchandise wheel.

13. An electronically actuated bulk vending machine for dispensing articles, comprising:

means for storing a plurality of articles where the articles, said means for storing including a generally open bottom;

rotatable means for controlled distribution of articles from the open bottom of the means for storing, said rotatable means for distributing selectively dispensing articles;

a base means for supporting said means for storing and said means for controlled distribution within said base, said base means having a bottom wall and side walls, said top accommodating a selective operating assembly mechanically linked to said means for controlled distribution, and an article dispensing opening being located on said base; and electronically actuated means for rotating said rotatable distribution means in communication with a currency receipt device and mechanically linked and cooperatively engaged to rotate within said base through a select arc upon selective actuation thereof.

14. The dispensing machine according to claim 13 where said means for distributing is a multi-chambered, molded plastic wheel having a diameter corresponding to the open bottom of said means for storing and rotatably mounted relative thereto for dispensing one article at a time.

15. An electronic bulk vending machine according to claim 13 further comprising a currency receipt mechanism in electrical signal communication with said electronic actuated means.

* * * * *